United States Patent [19]

Sellstedt

[11] 3,882,101

[45] May 6, 1975

[54] 2-HALO-5-ARYL-3H-1,4-BENZODIAZEPINES

[75] Inventor: John H. Sellstedt, King of Prussia, Pa.

[73] Assignee: American Home Products Corporation, New York, N.Y.

[22] Filed: Sept. 29, 1972

[21] Appl. No.: 293,701

[52] U.S. Cl. ....... 260/239 BD; 260/308 R; 424/244
[51] Int. Cl. .......................................... C07d 53/06
[58] Field of Search ............................ 260/239 BD

[56] References Cited
OTHER PUBLICATIONS

Sternbach et al. "Some Aspects of Structure–Activity Relationship in Psychotropic Agents of the 1,4-Benzodiazepine Series," A Symposium Held at the Regional Research Laboratory, Hyderbad, India CSIR New Delhi, India (1966).

*Primary Examiner*—Henry R. Jiles
*Assistant Examiner*—Robert T. Bond
*Attorney, Agent, or Firm*—Royal E. Bright

[57] ABSTRACT

2-Halo-5-aryl-3H-1,4-benzodiazepines, which are prepared from the corresponding 2-oxo derivatives, which are CNS depressants and which are intermediates for the preparation of known 6-aryl-4H-s-triazolo[4,3-a][1,4]benzodiazepines which are muscle relaxants, anticonvulsants, tranquilizers, and sedatives.

1 Claim, No Drawings

2-HALO-5-ARYL-3H-1,4-BENZODIAZEPINES

BACKGROUND OF THE INVENTION

This invention relates to compositions of matter classified in the art of chemistry as 2-halo-5-aryl-3H-1,4-benzodiazepines.

SUMMARY OF THE INVENTION

The invention sought to be patented, in its principal composition aspect, is described as residing in the concept of a chemical compound of Formula I

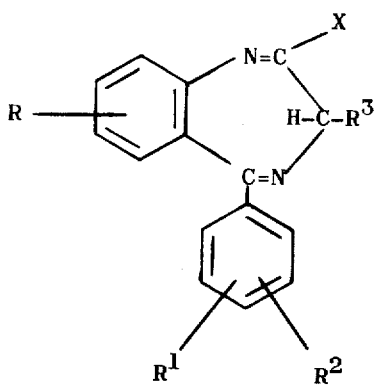

I wherein R is hydrogen, lower alkyl, lower alkoxy, phenyl, lower alkoxyphenyl, phenyl(lower)alkyl, heteroaryl, halo, trifluoromethyl, nitro,di(lower)alkylamino, carbalkoxy, lower alkyl thio, lower alkyl sulfonyl, lower alkyl sulphinyl, or cyano; $R^1$ is hydrogen, lower alkyl, lower alkoxy, phenyl, lower alkoxyphenyl, phenyl(lower)alkyl, heteroaryl, halo, trifluoromethyl, nitro,di(lower)alkylamino, carbalkoxy, lower alkyl thio, lower alkyl sulfonyl, lower alkyl sulphinyl, or cyano; $R^2$ is hydrogen, lower alkyl, lower alkoxy, phenyl, lower alkoxyphenyl, phenyl(alkyl, heteroaryl, halo, trifluoromethyl, nitro, di(lower)alkylamino, carbalkoxy, lower alkyl thio, lower alkyl sulfonyl, lower alkyl sulphinyl, or cyano, with the proviso that $R^1$ and $R^2$ are not adjacent trifluoromethyl; $R^3$ is hydrogen, lower alkyl, lower alkoxy, lower acyloxy, or halo; X is halo; and the pharmaceutically acceptable acid addition salts thereof.

The tangible embodiments of the composition aspect of the invention possess the inherent general physical properties of being crystalline solids, are substantially insoluble in water and are generally soluble in polar solvents such as acetonitrile, and dimethyl acetamide. Examination of compounds produced according to the hereinafter described process reveals, upon ultraviolet, infrared and nuclear magnetic resonance spectrographic analysis, spectral data supporting the molecular structures herein set forth. The aforementioned physical characteristics, taken together with the nature of the starting materials, the mode of synthesis, and the elemental analysis, confirm the structure of the compositions sought to be patented. The tangible embodiments of the invention possess the inherent applied use characteristic of being intermediates in the preparation of 6-aryl-4H-s-triazolo[4,3-a][1,4]benzodiazepines which are known to possess central nervous system depressant activity while having extremely low toxicity. Typical examples of these compounds and a description of their biological activity are given by Hester et al. in The Journal of Medicinal Chemistry (1971) Volume 14, pages 1078 to 1081.

In addition the tangible embodiments of the invention also possess the inherent applied use characteristics of exerting central nervous system depressant effects in experimental animals.

The invention sought to be patented, in a subgeneric composition aspect, is described as residing in the concept of a chemical compound of Formula Ia

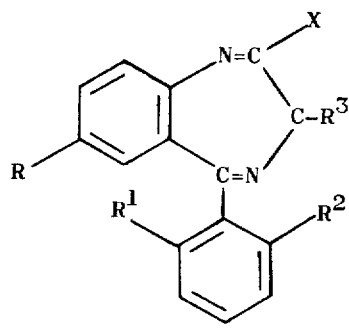

Ia wherein R is hydrogen, halo, trifluoromethyl, nitro, or thio methyl; $R^1$ is hydrogen, or halo; $R^2$ is hydrogen or halo; and $R^3$ and X are as defined hereinabove; and the pharmaceutically acceptable acid addition salts thereof. The tangible embodiments of the subgeneric composition aspect of the invention possess the inherent general physical properties of being crystalline solids, are substantially insoluble in water and are generally soluble in polar organic solvents such as acetonitrile, and dimethyl acetamide. Examination of the compounds produced by the hereinafter described process reveals, upon ultraviolet, infrared, and nuclear magnetic resonance spectrographic analysis spectral data supporting the molecular structure hereinbefore set forth. The aforementioned physical characteristics, taken together with the nature of the starting materials, the mode of synthesis, and the elemental analysis, confirm the structure of the subgeneric compositions sought to be patented.

DESCRIPTION OF THE PREFERRED EMBODIMENT

In describing the process for the preparation of a specific embodiment of the invention, reference will be made to

Figure A

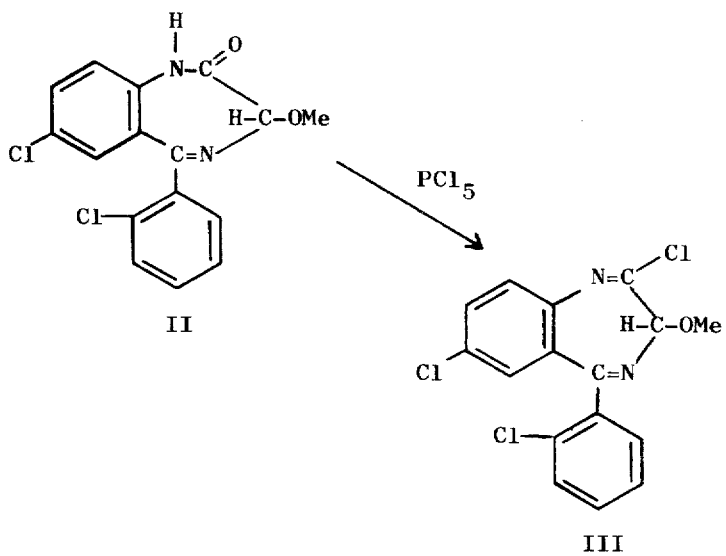

FIG. A wherein the compounds are assigned Roman numerals for identification schematically, and wherein is illustrated schematically the reaction sequence for preparing a specific embodiment of Formula 1 namely 2,7-di-chloro-5-(o-chlorophenyl)-3-methoxy-3H-1,4-benzodiazepine (III).

7-chloro-5-(o-chlorophenyl)-3-methoxy-3H-1,4-benzodiazepin-2-one is treated in an inert solvent such as dichloro-methane or chloroform, at a temperature of from 0° to 100° conveniently the reflux temperature of the inert solvent selected, with a chlorinating agent such as $PCl_5$, for a period of from 1 to 48 hours, conveniently about 18 hours, although a skilled organic chemist will recognize that depending upon the particular set of reactants and reaction conditions chosen the optimum time for producing optimum yield will vary somewhat. The 2,7-dichloro-5-(o-chlorophenyl)-3-methoxy-3H-1,4-benzodiazepine (II) may be recovered from the reaction mixture by conventional means.

While the process of the invention has been described with reference to the drawing which illustrates its application to 7-chloro-5-(o-chlorophenyl)-3-methoxy-3H-1,4-benzodiazepin-2-one it will be readily apparent that the process will be equally applicable to 5-aryl-3H-1,4-benzodiazepines bearing in the 3 and 7 positions, and on the aryl moiety, the various substituents contemplated within the scope of the invention.

The substitution of other halogenating agents, such as $PBr_5$ for the chlorinating agents illustrated, so as to produce the other 2-halo compounds contemplated within the scope of the invention will also be obvious to one skilled in the art.

The starting materials for the practice of the invention, namely the aforementioned variously substituted 5-aryl-3H-1,4-benzodiazepin-2-ones, are well-known in the literature and may be prepared by methods cited in the article, "The Chemistry of Benzodiazepines" by Giles A. Archer and Leo H. Sternbach in Chemical Reviews, Volume 68, page 747 (1968), and the references cited therein.

The central nervous system depressant activity of the tangible embodiments of the invention can be elicited by a series of pharmacological evaluation procedures well-known in the art. When administered to mice at dosage levels of 400, 127, 40, 12.7, 4.0, 1.27, 0.4, 0.127, 0.04 mg. per kg., followed by observation of effect over a minimum of 2 hours, the tangible embodimets of the invention exhibit the effect of inducing general depression of the animals as evidenced by decreased spontaneous motor activity and decreased respiration, loss of some reflex activity, and sedation and ataxia as determined by ease of a pole climb and inclined screen. For example 2,7-dichloro-5-(o-chlorophenyl)-3-methoxy-3H-1,4-benzodiazepine exhibits the effect of inducing decreased motor activity and decreased respiration when administered orally at a dose level of 40 mg. per kg. of body weight, and loss of righting reflex as well as sedation and ataxia at a dose level of 12.7 mg. per kg. of body weight. The tangible embodiments when administered orally to mice inhibit the clonic and tonic convulsion and death caused by metrazole. To demonstrate this effect the tangible embodiments are administered orally to groups of six mice, equally divided as to sex. One hour later the animals are challenged with metrazole 125 mg. per kg. i.p. The incidence of clonic anc tonic convulsions and death is observed for one-half hour. Relative protection against convulsions and death is determined by comparison with controls run simultaneously. For example 2,7-dichlor-5-(o-chlorophenyl)-3-methoxy-3H-1,4-benzodiazepine when administered orally to mice inhibits clonic convulsion induced by metrazole at an $ED_{50}$ of 0.068 mg. per kg. of body weight, inhibits tonic convulsions at an $ED_{50}$ of 0.03 mg. per kg. of body weight, and inhibits death at an $ED_{50}$ of 0.03 mg. per kg. of body weight. The tangible embodiments of the invention synergize with reserpine inducing ptosis in expermental animals. To demonstrated this effect, the tangible embodiments are administered to groups of 6 mice, equally divided as to sex. One hour later and animals are challenged with reserpine, 2.5 mg. per kg., i.p. The degree of ptosis for each eye is determined at 1 hour and 2 hours past treatment. The degree of ptosis is determined by comparison with controls run simultaneously. When administered orally to mice, 2,7-dichloro-5-(1-chlorophenyl)-3-methoxy-3H-1,4- benzodiazepine synergizes with reserpine in inducing ptosis. The tangible embodiments of the invention show little or no antagonism or synergism to the tremors, salivation, lacrimation, and diarrhea induced in experimental animals by tremorine. These effects may be demonstrated by administering the tangible embodiments at several graded close levels to groups of six mice, equally divided as to sex. One hour later the animals are challenged with tremorine, 30 mg. per kg. i.p. The animals are graded at one-half hour, 1 and 2 hours past treatment for degree of tremors, salivation lacrimation, and diarrhea. A comparison with simultaneously run controls is used to determine the effect of the test substance on the conditions. When administered orally to mice, 2,7-dichloro-5-(-chlorophenyl)-3-methoxy-3H-1,4-benzodiazepine antagonizes the tremors at an average $ED_{50}$ of greater than 400 mg. per kg., and synergizes with tremorine in inducind salivation, diarrhea, and lacrimation. The tangible embodiments of the invention exhibit the effect of inducing ataxia in experimental animals. This effect may be demonstrated by a procedure described by N. W. Dunham and T. S. Heya in the Journal of the American Pharmaceutical Association, Scientific Edition, 1957, Vol. 46, page 206. In this procedure the tangible embodiments are administered at a number of graded dose levels to groups of six mice, equally divided as to sex. At post treatment times of one-half hour, 1 and 2 hours each animal is tested on the rotarod for 1 minute. The degree of ataxia induced is determined by comparison with untreated control animals. When administered orally to mice 2,7-dichloro-5-(o-chlorophenyl)-3-methoxy-3H-1,4-benzodiazepine induces ataxia at a $ED_{50}$ of 44 mg. per kg. of body weight. The tangible embodiments of the inventionexhibit the effect of inhibiting the "Straub-tail and circling induced in mice by morphine. To demonstrate the effect the procedure described by Holten in Acta Pharmacologica et Toxicologica, 1957, Volume 13, page 113 is employed.

The tangible embodiments are administered at graded dose levels to groups of six mice, equally divided as to sex. One hour later the animals are challenged with morphine sulfate, 100 mg. per kg. i.p. The incidence of Straub-tail and circling is noted and compared with controls. When administered orally, to mice, 2,7-dichloro-5-(o-chlorophenyl)-3-methoxy-3H-1,4-benzodiazepine inhibits Straub-tail at an $ED_{50}$ of 7.6 mg. per kg. of body weight and circling at an $ED_{50}$ of 4.6 mg. per kg. of body weight. The tangible embodiments of the invention exhibit a protective effect against tonic electroshock seizures. To demonstrate this effect a procedure described by Swinyard, Brown, and Goodman in the Journal of Pharmacology, 1952, Volume 106, page 319 is employed. The tangible embodiments are administered orally to groups of six mice. One hour later the animals are given supramaximal electroshock through corneal electrodes, current strength of 25 milliamperes for 0.2 seconds. The presence or absence of tonic extensor seizures is noted and the percent protection against these seizures is calculated. When administered, to mice, 2,7-dichloro-5-(o-chlorophenyl)-3-methoxy-3H-1,4-benzodiazepine protects against tonic extensor seizures induced by electroshock at an $ED_{50}$ of 400 mg. per kg.

6-phenyl-4H-s-triazolo[4,3-a][1,4]benzodiazepines are prepared by treating the 2-halo-[1,4]benzodiazepines (I) contemplated by the present invention with an appropriately substituted tetrazole (IV) under basic reaction conditions, as illustrated in FIG. B Figure B:

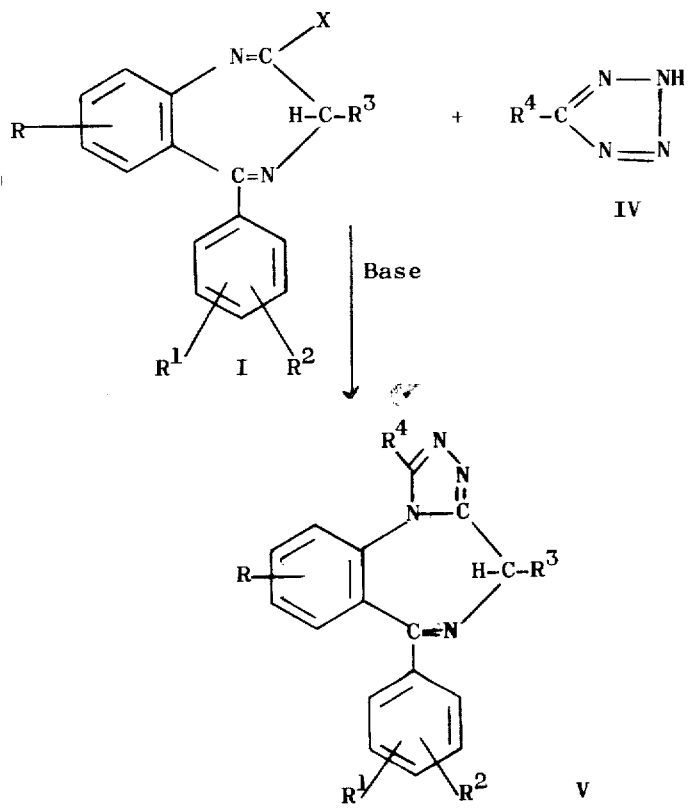

wherein R, R¹, R², R³, and X are as defined hereinabove and R⁴ is hydrogen, lower alkyl, phenyl, or substituted phenyl, heteroaryl, phenyl-(lower)alkyl, substituted phenyl(lower)alkyl, di(lower)alkylamino, carb-(lower)alkoxy, or lower alkoxy.

As used herein the term "lower alkyl" means a saturated hydrocarbon radical including the straight and branched chain radicals of from 1 to 6 carbon atoms, among which are for the purposes of illustration, but without limiting the generality of the foregoing, methyl, ethyl and i-butyl. The term "heteroaryl" means aromatic heterocyclyl radical containing from 3 to 5 carbom atoms and 1 or more atoms selected from the group nitrogen, oxygen and sulfur, among which are for the purposes of illustration, but without limiting the generality of the foregoing, 2-pyridyl, and 2-pyrimidimyl. The term halo means fluoro, chloro or bromo.

The following example further illustrates the best mode contemplated by the inventors for carrying out the invention.

EXAMPLE 2,7-Dichloro-5-(o-Chlorophenyl)-3-Methoxy-3H-1,4-Benzodiazepine

7-Chloro-5-(o-chlorophenyl)-3-methoxy-1H-1,4-benzodiazepin-2-one (100 g., 0.298 mole) and phosphorus pentachloride (125 g., 0.6 mole) are combined in 1200 ml. dichloromethane, and the mixture is refluxed for 18 hours giving a solution. Toluene (500 ml.) is added and the solution is stripped at 50°–60° on a rotary evaporator, giving a solid. The solid is dissolved in 200 ml. of acetone, and 200 ml. of ether is added. The solution is cooled, and the sides of the flask are scratched giving crystals. The mixture is filtered and the tan solid is washed with ether until the filtrate is colorless. The tan solid (59 g.), m.p. 137°–141°, is dried at 40° in vacuo for 18 hours. For analysis the title product is crystallized from acetonitrile or cyclohexane.

Anal. Calcd. for: $C_{16}H_{11}Cl_3N_2O$: C, 54.32; H, 3.11; N, 7.92; Cl, 30.07. Found: C, 54.71; H, 3.26; N, 7.78; Cl, 29.91.

The subject matter which the applicant regards as his invention is particularly pointed out and claimed as follows:

1. A compound which is 2,7-dichloro-5-(o-chlorophenyl)-3H-1,4-benzodiazepine.

* * * * *